United States Patent
Kopf et al.

(10) Patent No.: US 7,907,644 B2
(45) Date of Patent: Mar. 15, 2011

(54) HIGH-REPETITION LASER SYSTEM FOR GENERATING ULTRA-SHORT PULSES ACCORDING TO THE PRINCIPLE OF CAVITY DUMPING

(75) Inventors: Daniel Kopf, Rothis (AT); Maximilian Josef Lederer, Alberschwende (AT); Uwe Morgner, Berenbostel (DE)

(73) Assignee: High Q Laser Production GmbH, Hohenems (AT)

( * ) Notice: Subject to any disclaimer, the term of this patent is extended or adjusted under 35 U.S.C. 154(b) by 14 days.

(21) Appl. No.: 10/581,893

(22) PCT Filed: Dec. 10, 2004

(86) PCT No.: PCT/EP2004/014078
§ 371 (c)(1),
(2), (4) Date: Sep. 29, 2006

(87) PCT Pub. No.: WO2005/057741
PCT Pub. Date: Jun. 23, 2005

(65) Prior Publication Data
US 2007/0104230 A1  May 10, 2007

Related U.S. Application Data

(60) Provisional application No. 60/528,216, filed on Dec. 10, 2003, provisional application No. 60/586,735, filed on Jul. 12, 2004.

(51) Int. Cl.
*H01S 3/115* (2006.01)
*H01S 3/098* (2006.01)

(52) U.S. Cl. ............................................. 372/12; 372/18

(58) Field of Classification Search .................. None
See application file for complete search history.

(56) References Cited

U.S. PATENT DOCUMENTS

| | | | | |
|---|---|---|---|---|
| 3,675,154 A | * | 7/1972 | Duguay et al. | 372/33 |
| 4,849,036 A | * | 7/1989 | Powell et al. | 372/40 |
| 4,896,119 A | | 1/1990 | Williamson et al. | |
| 5,265,107 A | * | 11/1993 | Delfyett, Jr. | 372/11 |
| 5,790,574 A | * | 8/1998 | Rieger et al. | 372/12 |
| 5,848,080 A | | 12/1998 | Dahm | |
| 5,870,421 A | | 2/1999 | Dahm | |
| 6,016,324 A | | 1/2000 | Rieger et al. | |
| 6,807,198 B1 | | 10/2004 | Fürbach et al. | |

(Continued)

FOREIGN PATENT DOCUMENTS

EP   0 949 730   10/1999

(Continued)

OTHER PUBLICATIONS

Gloster, L.A.W. et al., "Diode-pumped Q-switched Yb:S-FAP laser," Optics Communications vol. 146, pp. 177-180, (1998).

(Continued)

*Primary Examiner* — Minsun Harvey
*Assistant Examiner* — Sean Hagan
(74) *Attorney, Agent, or Firm* — Oliff & Berridge, PLC

(57) ABSTRACT

A high-repetition laser system for generating ultra-short pulses according to the principle of pulse decoupling is described. This is achieved by the use of an amplifying laser medium, a laser resonator with at least one resonator mirror and at least one pulse decoupling component, a saturable absorber mirror, and a pump source for pumping the laser medium wherein the pulse decoupling component is an electro-optical modulator.

22 Claims, 4 Drawing Sheets

U.S. PATENT DOCUMENTS 6,834,064 B1 * 12/2004 Paschotta et al. .............. 372/18
2005/0152426 A1 * 7/2005 Dell'Acqua et al. ............ 372/69

FOREIGN PATENT DOCUMENTS

JP     A-2003-504878     2/2003
WO    WO 2004/107514 A2    12/2004

OTHER PUBLICATIONS

Kruger, E., "High-repetition-rate electro-optic cavity dumping," Rev. Sci. Intrum. vol. 66, pp. 961-967, Feb. 1995.

Krausz, Ferenc et al., "Femtosecond Solid-State Lasers," IEEE Journal of Quantum Electronics, vol. 28, No. 10, pp. 2097-2122, Oct. 1992.

Kubecek, Vaclav et al., "Practical source of 50 ps pulses using a flashlamp pumped Nd:YAG laser and passive all-solid-state pulse control,"Optics Communications vol. 177, pp. 317-321, (2000).

Paschotta, R. et al., "Passive mode locking with slow saturable absorbers," Applied Physics B, vol. 73, pp. 653-662, (2001).

Ramaswamy, M. et al., "Cavity-dumped femtosecond Kerr-lens mode-locked Ti:A12O3 laser," Optics Letters, vol. 18, No. 21, Nov. 1, 1993.

Baltuska, A. et al., "All-solid-state cavity-dumped sub-5-fs laser," Applied Physics B, vol. 65, pp. 175-188, 1997.

P. Raybayt et al.; "Diode-Pumped 100-fs Lasers Based on a New Apatite-Structure Crystal : $Yb^{3+}:SrY_4(SiO_4)_3O$;" Lasers and Electro-Optics Europe, Jun. 22, 2003, pp. 423-423.

Zhang Zhigang et al.: "A Mirror-Dispersion-Controlled and Self-Started Femtosecond Ti: Sapphire Laser", Acta Optica Sinica vol. 21, No. 2 [Feb. 2001], p. 253-254 (with partial translation).

Mar. 23, 2010 Office Action issued in Japanese Patent Application No. 2006-543490 (with English translation).

* cited by examiner

HIGH-REPETITION LASER SYSTEM FOR GENERATING ULTRA-SHORT PULSES ACCORDING TO THE PRINCIPLE OF CAVITY DUMPING

The invention relates to high-repetition laser system for generation ultra-short pulses according to the principle of pulse decoupling according to the precharacterizing clause of Claim 1 and a use of the laser system.

Known ultra-short pulse laser systems are used in a large number of applications, such as, for example, material processing, microscopy, biomedicine or the production of photonic components. However, use outside a laboratory is often problematic since the laser systems necessitate considerable complexity and a major handling effort. In addition to the high energy of the femtosecond pulses, in particular the compactness of the laser systems plays an important role for industrial use.

Laser arrangements according to the principle of pulse decoupling or of the cavity dumper permit the generation of pulses which have energies and peak pulse powers required for use in the area of microstructuring. It is possible thereby to dispense with the use of complex amplifier arrangements, which leads to a compact design.

A laser system according to the principle of pulse decoupling or the cavity dumper having pulse energies of up to 100 nJ is known, for example, from M. Ramaswamy, M. Ulman, J. Paye, J. G. Fujimoto, "Cavity-dumped femtosecond Kerr-lens mode-locked Ti:Al$_2$O$_3$ laser", Optics Letters, vol. 18, no. 21, 1 Nov. 1993, pages 1822 to 1824. This document is hereby incorporated by reference into this Application. A mode-coupled Ti:Al$_2$O$_3$ laser is operated for generating 50 femtosecond pulses having an energy of 100 nJ or peak pulse powers of 0.1 MW and an adjustable rate up to 950 kHz with an acousto-optical switch as a cavity dumper. The switch itself consists of a quartz cell onto which the laser beam is focused by means of a mirror at the Brewster angle. An argon laser is used for pumping and a downstream zone having 4 prisms is used for dispersion compensation.

A. Baltuška, Z. Wie, M. S. Pshenichnikov, D. A. Wiersma, Robert Szipöcs, "All-solid-state cavity-dumped sub-5-fs laser", Appl. Phys. B 65, 1997, pages 175 to 188, describe a solid-state laser system by means of which laser pulses having a duration of less than 5 femtoseconds are generated according to the principle of the cavity dumper. This document is hereby incorporated by reference into this Application. The Ti-sapphire laser medium used is pumped by a frequency-doubled solid-state laser which is once again diode-pumped and has Nd:YVO$_4$ as a laser medium. The formation as a cavity dumper is effected by means of a Bragg cell as an acousto-optical switch. This arrangement requires careful design of the cavity so that mode coupling by the Kerr lens effect is not disturbed by the dispersion of the acousto-optical modulator. A possible use of electro-optical modulators is mentioned, but their limitation to achievable repetition rates of about 10 kHz is emphasized. With the laser system described, it is intended to realize sub-5-fs pulses having a peak pulse power of 2 megawatt and a repetition rate of 1 MHz.

A high-repetition laser with cavity dumping and an electro-optical switch is described by D. Krüger in "High-repetition-rate electro-optic cavity dumping", Rev. Sci. Instrum. 66 (2), February 1995, pages 961 to 967. This document is hereby incorporated by reference into this Application. A mode-coupled dye laser synchronously pumped by an argon laser serves as a basis of the arrangement, an LM 20 Pockels cell comprising two deuterated KD*P crystals with a thin-film polarizer being used as the switch. The laser medium consists of a solution of Rhodamine 6G in ethylene glycol. The pulses generated have a duration of 15 nanoseconds at an average decoupled power of 75 mW and a repetition rate of 10 MHz.

A laser according to the cavity dumper principle with electro-optical switch is described by V. Kubecek, J. Biegert, J.-C. Diels, M. R. Kokta, "Practical source of 50 ps pulses using a flashlamp pumped Nd:YAG laser and passive all-solid-state pulse control", Optics Communications 177 (2000), pages 317 to 321. This document is hereby incorporated by reference into this Application. An Nd:YAG laser medium is pumped by a flashlamp. The electro-optical switch used is a Pockels cell with a dielectric polarizer. The achievable energies of the 50 picosecond pulses are stated as 300 µJ at repetition rates of 5 Hz, compression of individual pulses within the cavity being effected.

Ti:Al$_2$O$_3$ lasers therefore surpass the dye lasers in the achievable peak pulse powers. However, the achievable pulse energy is limited by the use of the acousto-optical modulators since the effect of self-phase modulation is too high for these owing to the required small focuses, which can result in pulse instability or destruction of the modulator material. Moreover, in the case of dye lasers, there is a time-related degradation of the laser medium and pumping by flashlamps or solid-state lasers leads to complex systems.

Generic laser systems of the prior art are therefore too complex owing to their design and the components used and/or are limited in the achievable pulse energy or do not achieve pulse durations in the femtosecond range.

An object of the present invention is to provide a compact laser system, in particular a diode-pumped laser system according to the principle of pulse decoupling, which generates ultra-short pulses having a repetition rate greater than 10 kHz and pulse energies above 100 nJ.

A further object is to provide a compact laser system, in particular without element for pulse amplification outside the cavity, having a peak pulse power greater than 100 kW at a repetition frequency greater than 10 kHz.

These objects are achieved or the solutions are further developed by the subject matter of Claim 1 or of the dependent Claims, respectively.

The invention relates to a high-repetition laser system according to the principle of pulse decoupling, in which a diode-pumped pico- or femtosecond oscillator is operated with an electro-optical modulator as a switch.

An advantage of the EOM in comparison with the AOM is that the EOM can be operated with very large beam cross-sections (e.g. d=700 µm) so that higher energies are possible. To avoid excessive self-phase modulation (SPM) or even destruction at the pulse powers or pulse energies to be generated in the switch. An SiO$_2$-AOM on the other hand typically requires d<50 µm at a modulator length of 3 mm in order to achieve the same shortness of the switching flank. It is true that it is possible to obtain longer modulator cells in which the focussing can be kept larger. However, owing to the increase in the interaction length, the accumulated non-linear phase does not decrease markedly. In addition—in order to achieve switching efficiencies comparable with the EOM method—the AOM must be operated in the Michelson configuration which means a comparatively complex resonator design.

If it was intended, for example, to generate femtosecond pulses having 1 µJ energy and 200 fs pulse width at the exit of the pulse decoupler, a pulse energy of 2 µJ would typically have to be present within the cavity. This requirement results from the necessity for operating the cavity-dumped laser in a quasi-stationary manner, which is difficult to achieve at high repetition rates and degrees of decoupling of >50%. At said cross-sections and powers in the AOM, owing to the soliton condition $$|\beta_2| = \frac{\tau_{FWHM} \cdot E \cdot \kappa}{3.526} \quad (1)$$

where $$\kappa = \frac{4 \cdot l_{AOM} \cdot n_2}{\lambda_0 \cdot \omega_0^2} \quad (2)$$

a 200 fs soliton could be stabilized at 1 μm wavelength only if the high negative net dispersion of about −40 000 fs$^2$ were to be introduced into the resonator. Here, $\beta_2$ designates the negative net dispersion inside the resonator,
$\tau_{FWHM}$ designates the full width at half maximum of the sech$^2$ solitons,
E designates the pulse energy,
$\kappa$ designates the self-phase modulation parameter,
$l_{AOM}$ designates the single length of the acousto-optical modulator,
$n_2$ designates the non linear refractive index originating from the Kerr effect,
$\lambda_0$ designates the vacuum wavelength and
$\omega_0$ designates the beam radius in the AOM.

In addition, problems still remain when such a dispersion is present since, in a single pass, an excessively high chirp forms and the pulse parameters change too greatly during a resonator cycle. The result of this is that stationary soliton operation is not possible and as a rule dispersive radiation forms in the resonator and then leads to multiple pulses or dynamic instability. For example, the ratio r of the resonator period and the soliton period can be defined as a measure of an inclination of the laser in this respect.

$$r = \frac{E \cdot \kappa \cdot 1.763}{\pi \cdot \tau_{FWHM} \cdot 1.134} \quad (3)$$

For stable operation, this ratio should be <<1. In the above case the value would be about 3, which is clearly too high. In the generation of femtosecond pulses, it is therefore advantageous to choose the r parameter to be less than 1, in particular less than 0.25 or even less than 0.1. The basis of this calculation is described by F. Krausz, M. E. Fermann, T. Brabec, P. F. Curly, M. Hofer, M. H. Ober, C. Spielman, E. Wintner and A. J. Schmidt "Femtosecond Solid-State Lasers" in IEEE Journal of Quantum Electronics, vol. 28, no. 10, pages 2097-2120, October 1992. This document is hereby incorporated by reference into this Application.

For a femtosecond laser system according to the principle of pulse decoupling, the pulse energy is therefore more easily scalable with an EOM than with an AOM.

For typical modulator materials (e.g. BBO) and modulator lengths, the dispersion generated by the EOM can be relatively easily compensated by a sequence of dispersive components, e.g. mirrors, in the cavity. The number of dispersive mirrors is determined by the positive dispersion to be compensated in the cavity, to which all mirrors, the laser medium, the thin-film polarizer and the BBO EOM contribute with a principal proportion and by the soliton condition. The latter states that, for a certain cyclic pulse energy, a parameter of the self-phase modulation and a pulse width to be achieved, a certain negative net dispersion must prevail in the cavity. Owing to the large beam cross-sections which are possible in the case of the EOM switch, the parameter κ of the self-phase modulation is determined only by the beam cross-section in the laser medium and the non-linear refractive index $n_2$ thereof.

For dispersion compensation, it is possible to use dispersive mirrors, e.g. Gires-Tournois interferometers, which thus serve for compensating the positive dispersion in the cavity and for fulfilling the soliton condition.

With such a design of a laser system according to the principle of pulse decoupling, femtosecond pulses having a repetition frequency of up to 1 MHz and a pulse energy of 500 nJ and therefore more than 1 MW power were generated. The laser system is operated in a mode-coupled manner with the use of the dispersive mirrors and of a saturable absorber mirror.

Owing to the achievable radiation characteristic, a laser system according to the invention also permits use for direct, i.e. amplifier-free material processing. Here, a plasma which is used for processing is generated by the radiation field in direct contact with the material.

A working example of a laser system according to the invention is shown schematically below and described in more detail purely by way of example. Specifically, FIG. 1 shows the diagram of a first working example of the laser system according to the invention in the femtosecond range;

Figure 1:
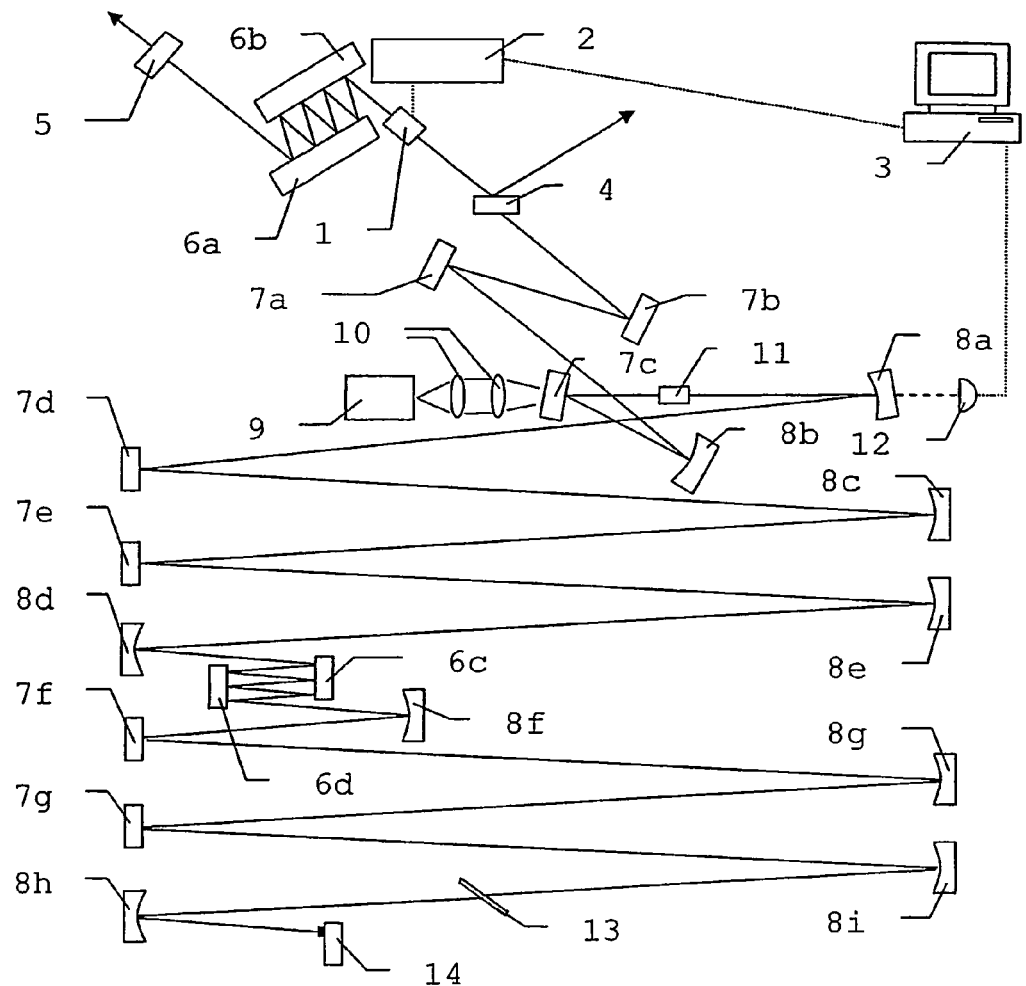

FIG. 1 shows a first working example of the laser system according to the invention according to the principle of pulse decoupling for the femtosecond range. The laser system is based on a folded cavity in an embodiment known per se. The laser medium 11 used is ytterbium-doped LG760 glass, which is pumped with a pump diode 9 emitting at 976 nm, via a combination of two achromatic lenses 10. Further suitable materials for the laser medium 11 are, for example, ytterbium-doped tungstates, such as, for example, Yb:KGW or Yb:KYW. The lenses 10 have focal distances of 30 mm and 75 mm, respectively. Soliton mode coupling is brought about by a mirror 14 which can absorb with saturation and dispersive mirrors 6a-d, 7a-g, 8a-i for producing the necessary negative dispersion. For avoiding excessive self-phase modulation of an acousto-optical modulator, a beta-barium borate (BBO) Pockels cell is used as electro-optical element 1 together with a thin-film polarizer 4 for pulse decoupling, which is connected via a high-voltage supply 2 and a computer as switching signal generator 3. Depending on the voltage applied to the electro-optical element 1, the plane of polarization of a laser beam is rotated so that decoupling can be effected via the thin-film polarizer 4.

In the cavity, a pulse builds up from the noise or from a radiation field remaining from a preceding pulse and is amplified at each pass by the laser medium 11, multiple reflection at the dispersive mirrors 6c-d, 7a-g, 8a-i taking place. After a certain number of resonator cycles and passes through the amplifying laser medium 11, the pulse is decoupled by rotation of the polarization by means of switching of the electro-optical element 1 via the thin-film polarizer 4 as a laser pulse. This arrangement represents only one working example for a laser arrangement according to the principle of pulse decoupling.

The individual components of the laser arrangement in FIG. 1 are designated as follows:
1 electro-optical element
2 high-voltage supply
3 switching signal generator
4 thin-film polarizer
5 high reflector
6a-d dispersive planar mirror
7a-g dispersive planar mirror
8a-I dispersive curved mirror
9 pump diode
10 achromatic lens
11 laser medium
12 photo diode
13 birefringent filter
14 mirror which can absorb with saturation A further suitable component for an electro-optical modulator is, for example, a cell comprising $RTiOPO_4$ or rubidium titanyl phosphate (RTP). Owing to the thermal drift effects which occur, readjustment or regulation in this respect is advantageous.

Figure 2:
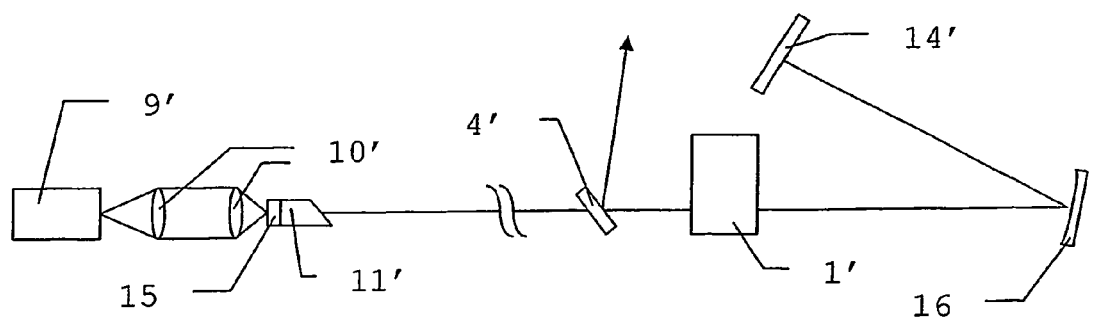
FIG. 2 shows the diagram of a second working example of the laser system according to the invention in the picosecond range.

FIG. 2 shows a diode-pumped, SESAM-mode-coupled Nd:YVO$_4$ picosecond laser according to the principle of pulse decoupling with EOM as a second working example of the laser system according to the invention. The laser system resembles the arrangement shown in FIG. 1 and is likewise based on a folded cavity in an embodiment known per se, which, however, is not shown explicitly in FIG. 2 for reasons of clarity. Nd:YVO$_4$ which is provided with a partly transparent mirror layer 15 and is pumped by a pump diode 9' via a combination of two achromatic lenses 10' is used as laser medium 11'. The pulse decoupling is effected via an electro-optical element 1' and a thin-film polarizer 4'. The mode coupling is effected by a mirror 14' which can absorb with saturation. The cavity is folded by a curved mirror 16.

In contrast to the femtosecond laser system of FIG. 1, it is possible to dispense with dispersion management so that no sequence of dispersive mirror elements is necessary.

On generation of picosecond pulses, it is advantageous for stability reasons to choose the nonlinear phase to be less than 100 mrad, in particular less than 10 mrad, the nonlinear phase being calculated per resonator cycle and per 1% modulation depth of the saturable absorber mirror. The effect of self-phase modulation on the stability of a picosecond laser is described, for example, in R. Paschotta, U. Keller, "Passive mode locking with slow saturable absorbers", Appl. Phys. B73, pages 653-662, 2001. By choosing a correspondingly large mode diameter on the electro-optical modulator and in the laser medium, it is possible to keep the non linear phase sufficiently small.

As an alternative to the arrangements of FIG. 1 and FIG. 2, a disc-like laser medium in so-called thin-disc arrangement can also be used, it being possible for this also to be pumped with asymmetric pump light spots in addition to a round pump light spot. In order to avoid excessively high thermal loading of the laser-active material, a substantially elongated pump light spot is incident on a laser medium arranged on a temperature sink, so that the two-dimensional heat flow forms. As a result, improved cooling and a reduction in the maximum temperature are achieved. Such an arrangement is described, for example, in PCT/EP2004/005813. The effect of multiple reflections can also be used for producing an elongated pump light spot. Here, by means of a mirror surface tilted relative to another surface, it is possible to achieve multiple reflection with variable distance of the reflection points, which leads to reversal of the direction after a certain number of reflections. In this example, the reflections are effected between the mirror surface and a reflection layer in or on the laser medium, it being possible for this reflection layer to be applied between laser medium and temperature sink. The pump light beam, for example from a single laser diode or a plurality of laser diodes, is inserted and decoupled again from one side in this setup so that an arrangement of advantageous design is possible. Alternatively, however, the mirror surface can also be arranged plane-parallel to the reflection layer so that a reversal of direction of part of the beam is effected by a further mirror in a manner known per se. In an analogous manner, the laser mode and hence the radiation field to be amplified can also be passed several times through the laser medium and can thus experience multiple amplification. Particularly with respect to minimization of the self-phase modulation, the disk arrangement has the advantage that the optical length of the optical laser medium can be kept very small (typically <<1 mm).

Figure 3:
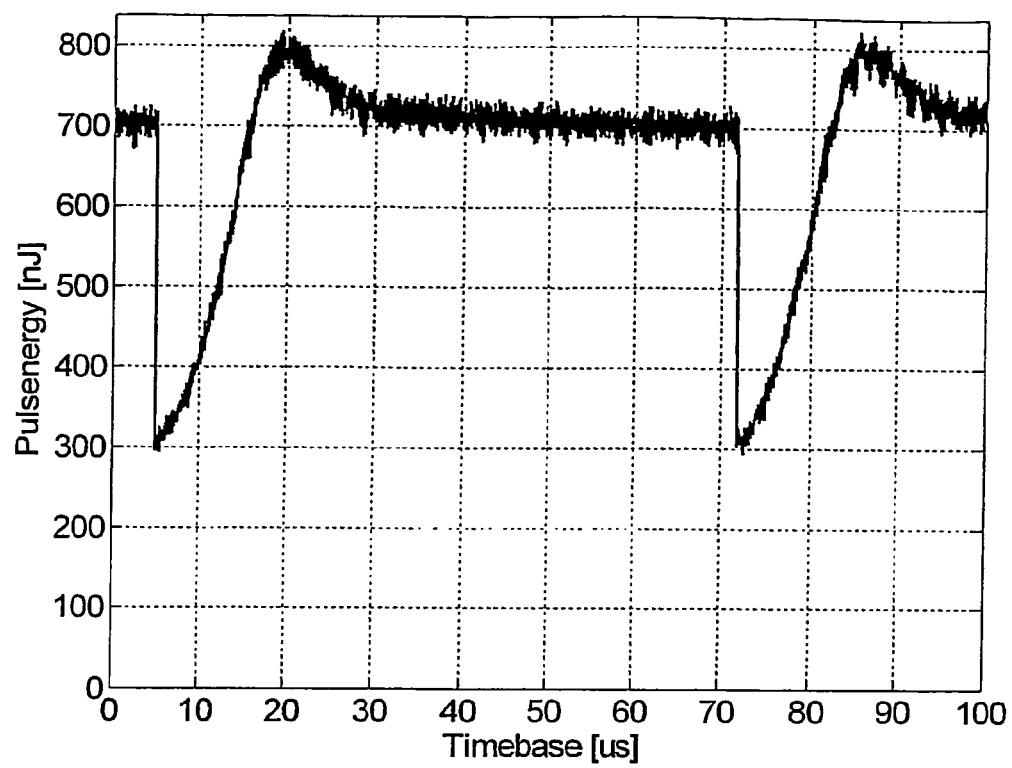
FIG. 3 shows the diagram of the pulse energy curve within the cavity as a function of time for a repetition frequency of 15 kHz in a femtosecond arrangement.
Figure 4:
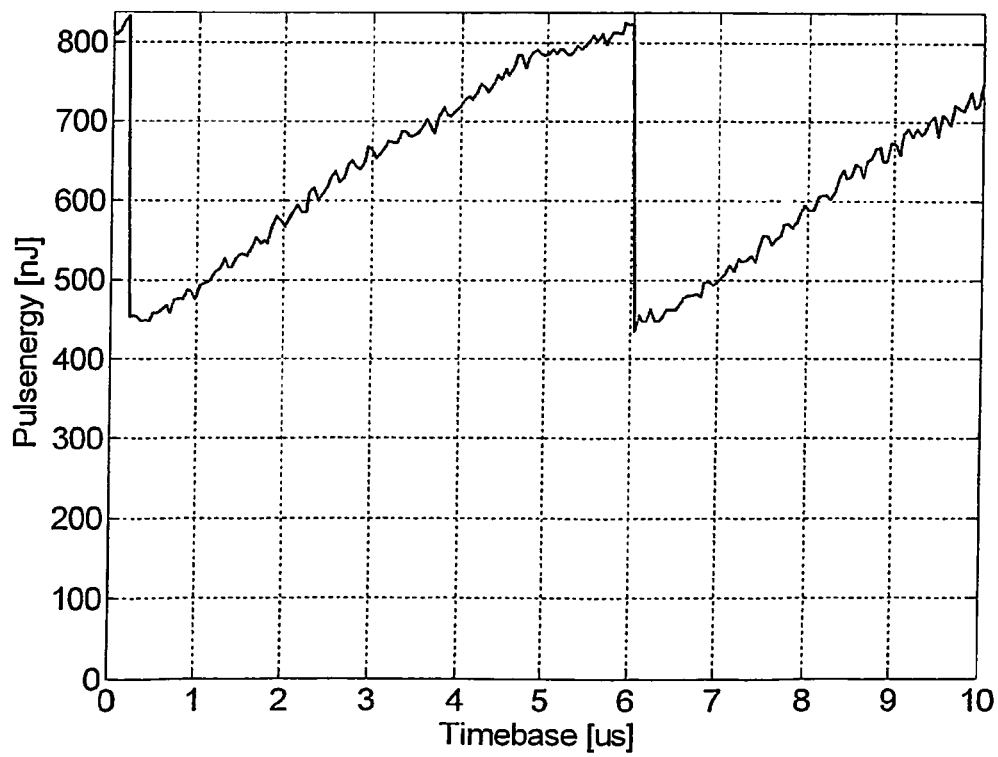
FIG. 4 shows the diagram of the pulse energy curve within the cavity as a function of time for a repetition frequency of 173 kHz in a femtosecond arrangement.

FIG. 3 and FIG. 4 show the pulse energy curve within the cavity as a function of time. By means of the laser system according to the invention, repetition rates of the decoupling of up to more than 1 MHz can be achieved, the contrast between decoupled pulses and the weak background pulses being better than 1:1000. Pulse energies achieved are more than 400 nJ which corresponds to peak pulse powers of more than 1 MW. The spectral width of the output is 4 nm and the duration of the decoupled pulses is about 300 fs, which was determined by autocorrelation. Consequently, a time-bandwidth product of 0.33 results, which is close to the Fourier limit.

FIG. 3 and FIG. 4 show typical curves of the relaxation between pulse decouplings. FIG. 3 shows the curve at a repetition rate of 15 kHz and FIG. 4 at 173 kHz. In FIG. 4, a stationary state is reached again after each decoupling, the relaxation oscillation being greatly damped, which can be explained by the soliton pulse dynamics. In FIG. 4, the decoupling takes place during the buildup of the radiation field and hence before reaching a stationary state.

Figure 5:
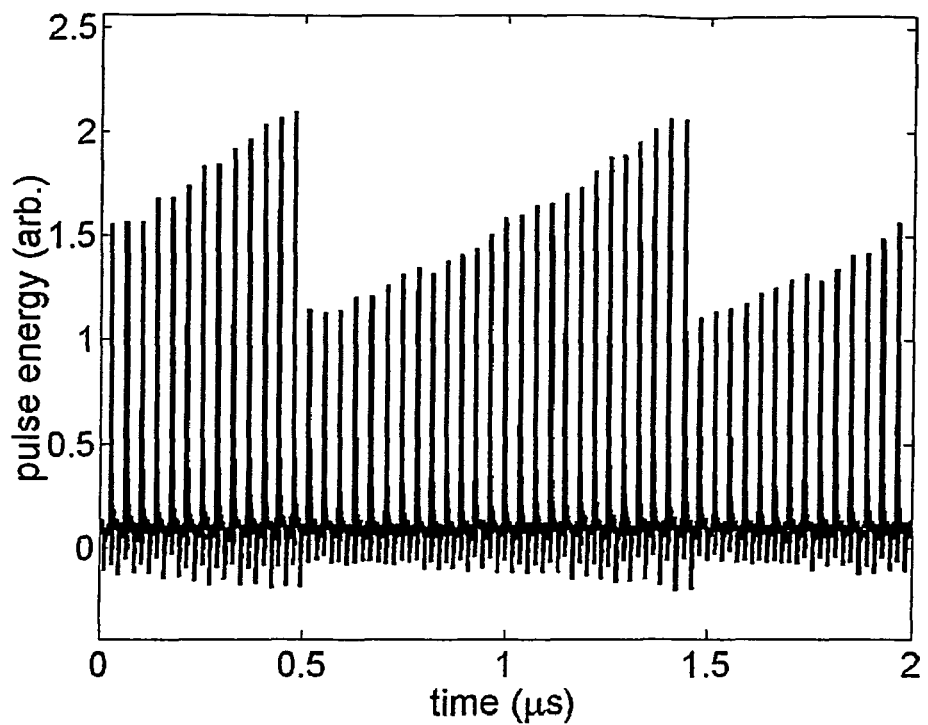
FIG. 5 shows the diagram of the pulse evolution within the cavity for a repetition frequency of 1 MHz in a picosecond arrangement.

FIG. 5 shows the diagram of pulse evolution within the cavity for a repetition frequency of 1 MHz in a picosecond arrangement comprising an Nd:vanadate laser with EOM. The pulse evolution is plotted in normalized form as a function of time and relative to a reference value. The individual decoupling processes and the subsequent build-up of the pulse again are shown. The degree of decoupling is about 40% and the pulse energy measured outside the cavity is about 1.7 µJ.

Figure 6:
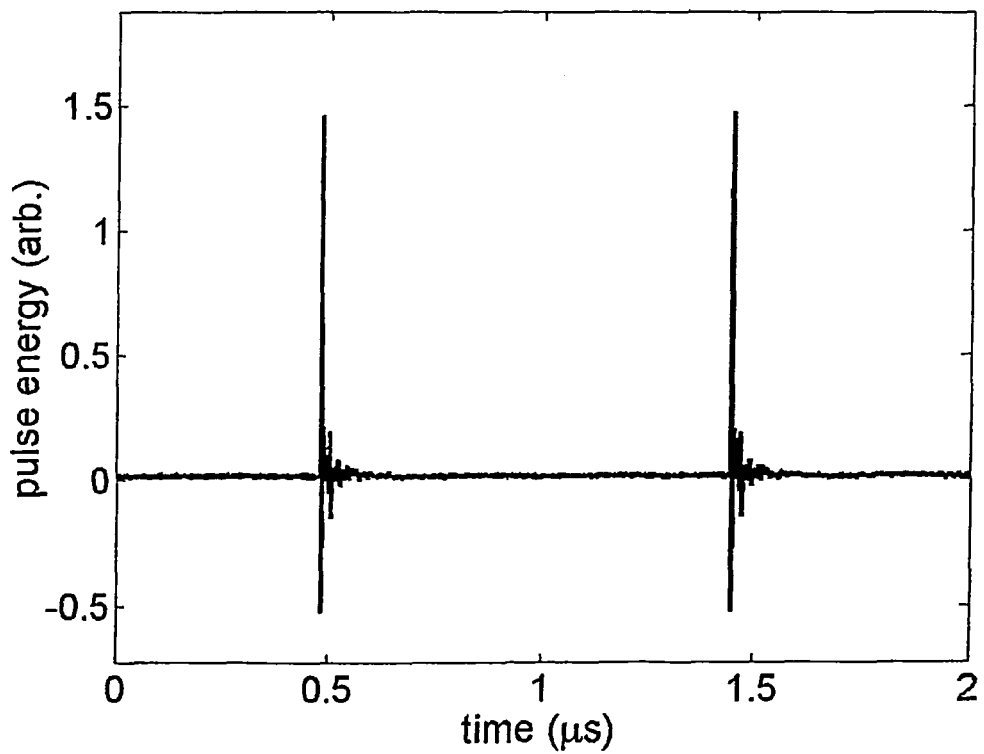
FIG. 6 shows the diagram of the pulse evolution after decoupling outside the cavity for a repetition frequency of 1 MHz in a picosecond arrangement.

The pulse evolution after decoupling and hence outside the cavity is shown for this example in FIG. 6.

Figure 7:
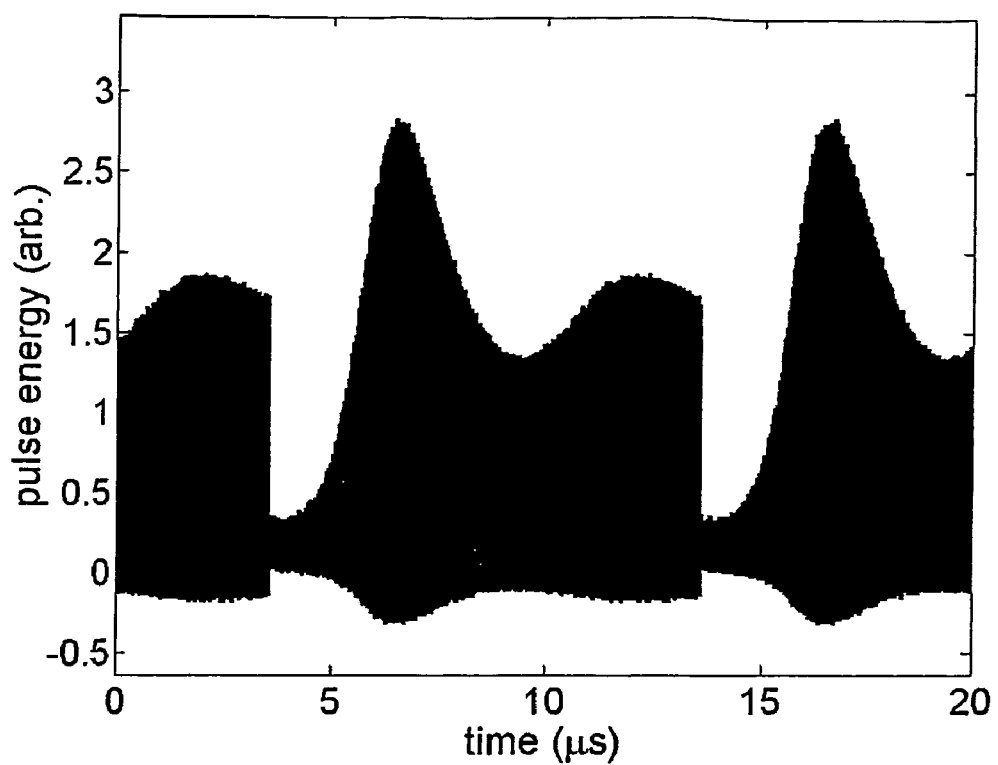
FIG. 7 shows the diagram of the pulse evolution within the cavity for a repetition frequency of 100 kHz in a picosecond arrangement and FIG. 8 shows the diagram of the curve of the decoupled energy as a function of the frequency of decoupling for femto- and picosecond arrangement.

FIG. 7 shows the diagram of the pulse evolution within the cavity for a repetition frequency of 100 kHz in a picosecond arrangement. The relaxation oscillations of the laser between the individual decoupling processes are clearly evident.

Figure 8:
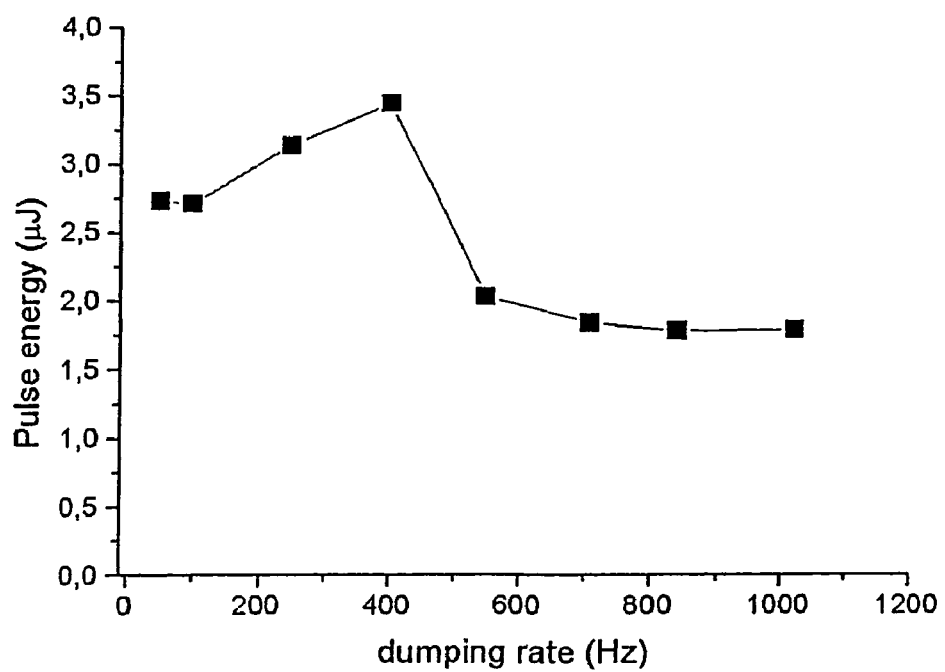

FIG. 8 shows the curve of the decoupled energy as a function of the frequency of decoupling for the picosecond case. The excessive rise observed at about 400 kHz corresponds to the first maximum of the relaxation oscillation which occurs at this decoupling frequency.

Of course, the laser systems or laser arrangement shown represent only working examples for many embodiments which can be realized according to the invention and the person skilled in the art can derive alternative forms for realising the laser design, for example with the use of other resonator arrangements, resonator components or pumping methods, such as, for example, thin-disc lasers. In particular, it is possible to design the switching and/or control elements differently from the stated examples, for example by using alternative dispersive components, laser media or other electro-optical elements which also make it possible to realize higher repetition rates.

The invention claimed is:

1. High-repetition mode-coupled ultra-short pulse laser system for generating pulses, according to the principle of cavity dumping, comprising:
    an amplifying laser medium;
    a laser resonator with at least one resonator mirror and at least one cavity dumping component;
    a saturable absorber mirror; and
    a pump source for pumping the laser medium;
    wherein the cavity dumping component is an electro-optical modulator and the laser system is configured to generate femtosecond or picosecond pulses with a repetition rate of greater than 10 kHz and a peak pulse power greater than 100 kW.

2. The ultra-short pulse laser system according to claim 1, wherein the electro-optical modulator is a BBO cell.

3. The ultra-short pulse laser system according to claim 1, wherein the electro-optical modulator is an RTP cell.

4. The ultra-short pulse laser system according to claim 1, further comprising at least one dispersive mirror for dispersion compensation.

5. The ultra-short pulse laser system according to claim 4, wherein the laser system is formed so that, in the generation of picosecond pulses, the nonlinear phase is less than 100 mrad, the nonlinear phase being calculated per resonator cycle and per 1% modulation depth of the saturable absorber mirror.

6. The ultra-short pulse laser system according to claim 1, wherein the laser system is formed so that, in the generation of femtosecond pulses, the r parameter is less than 1.

7. The ultra-short pulse laser system according to claim 1, wherein the laser medium is ytterbium-doped glass or Nd:YVO$_4$.

8. The ultra-short pulse laser system according to claim 1, wherein the laser medium comprises ytterbium-doped tungstates.

9. The ultra-short pulse laser system according to claim 1, wherein the laser medium has a disc-like geometry.

10. The ultra-short pulse laser system according to claim 1, wherein the pump source is formed and is arranged in such a way that a pump light spot having a ratio of length to width of at least 2:1 is formed, the pump light spot consisting of a single ray or the combination of a plurality of rays.

11. The ultra-short pulse laser system according to claim 1, wherein the pump source is a laser diode source.

12. The ultra-short pulse laser system according to claim 3, wherein the RTP cell comprises a component for compensating a thermal drift.

13. The ultra-short pulse laser system according to claim 4, wherein the at least one dispersive mirror for dispersion compensation is a Gires-Tournois interferometer.

14. The ultra-short pulse laser system according to claim 5, wherein the nonlinear phase is less than 10 mrad.

15. The ultra-short pulse laser system according to claim 6, wherein the r parameter is less than 0.25.

16. The ultra-short pulse laser system according to claim 8, wherein the laser medium comprises Yb:KGW or Yb:KYW.

17. The ultra-short pulse laser system according to claim 10, wherein the pump light spot consists of the combination of a plurality of rays, the rays being generated by laser diodes.

18. A method of processing a material, comprising:
    providing a material to be processed by plasma generation, and
    processing the material using the high-repetition mode-coupled ultra-short pulse laser system according to claim 1.

19. The ultra-short pulse laser system according to claim 1, wherein the repetition rate is greater than 100 kHz.

20. The ultra-short pulse laser system according to claim 1, wherein the laser system is configured to generate the pulses with a pulse energy above 100 nJ.

21. The ultra-short pulse laser system according to claim 1, wherein the laser system is configured to generate the pulses with a peak pulse power greater than 1 MW.

22. The ultra-short pulse laser system according to claim 1, wherein the laser system is configured to generate the pulses with a pulse energy above 400 nJ.

* * * * *